July 16, 1940.  A. W. COWLES  2,208,016
MEANS FOR AUTOMATICALLY STOPPING VEHICLES AT RAILROAD CROSSINGS
Filed Feb. 2, 1938  5 Sheets-Sheet 1

Inventor
A. W. Cowles
By his Attorneys
Merchant & Merchant

July 16, 1940.  A. W. COWLES  2,208,016
MEANS FOR AUTOMATICALLY STOPPING VEHICLES AT RAILROAD CROSSINGS
Filed Feb. 2, 1938  5 Sheets-Sheet 2
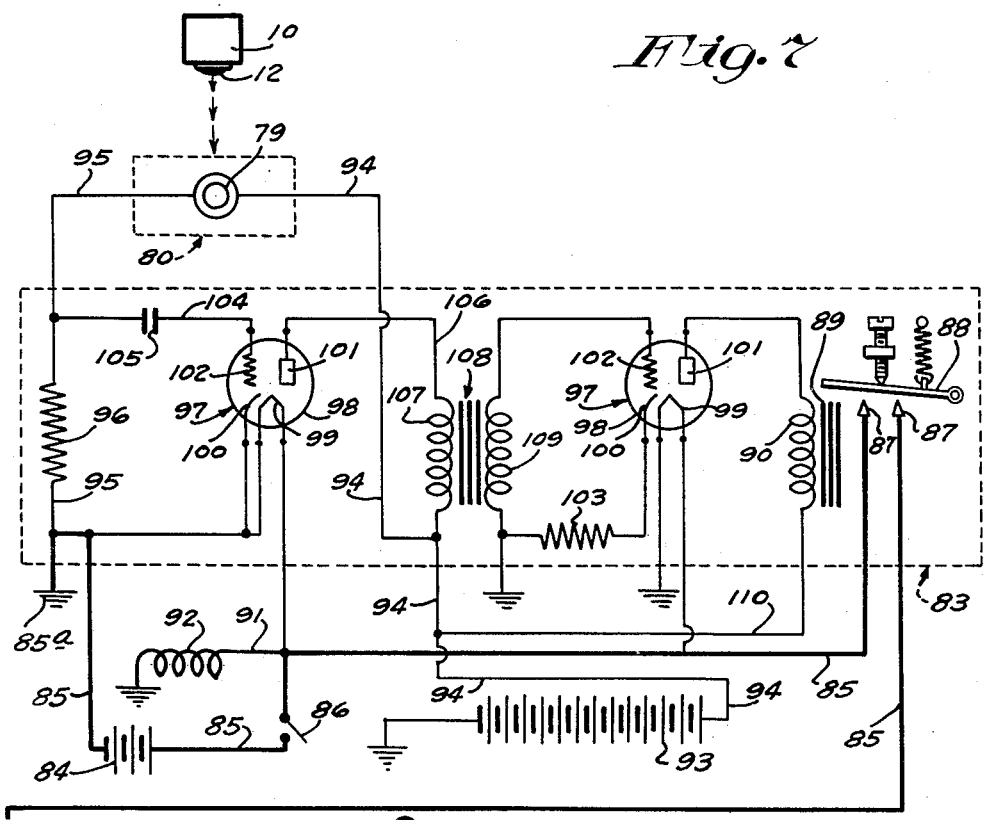
Fig. 7
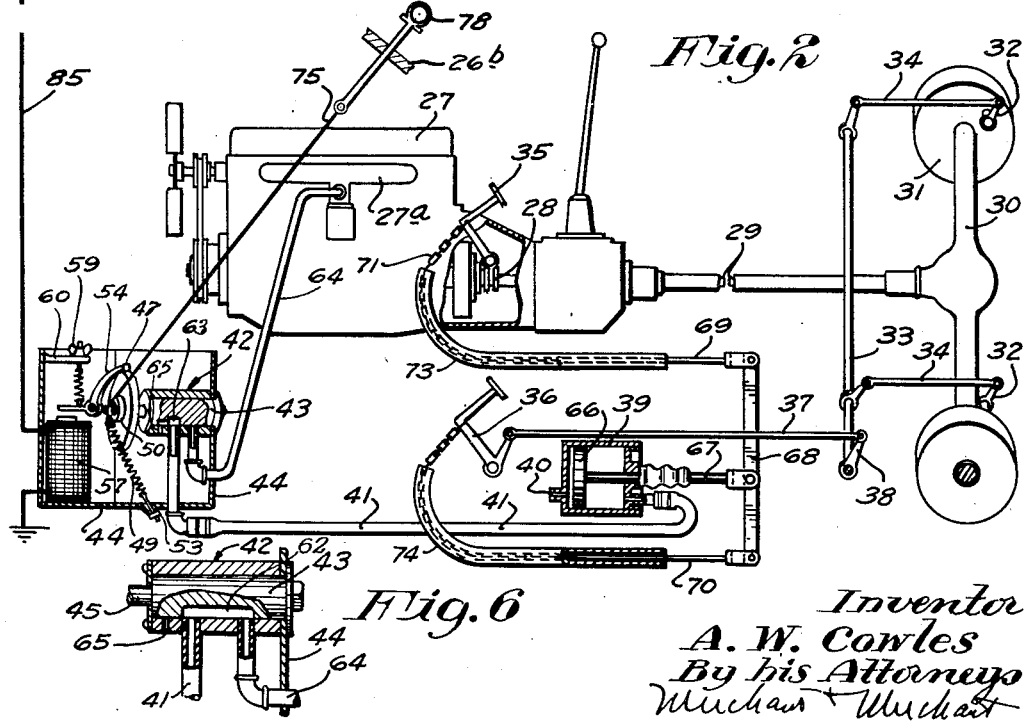
Fig. 2
Fig. 6
Inventor
A. W. Cowles
By his Attorneys
Michael + Michael July 16, 1940.  A. W. COWLES  2,208,016
MEANS FOR AUTOMATICALLY STOPPING VEHICLES AT RAILROAD CROSSINGS
Filed Feb. 2, 1938   5 Sheets-Sheet 3
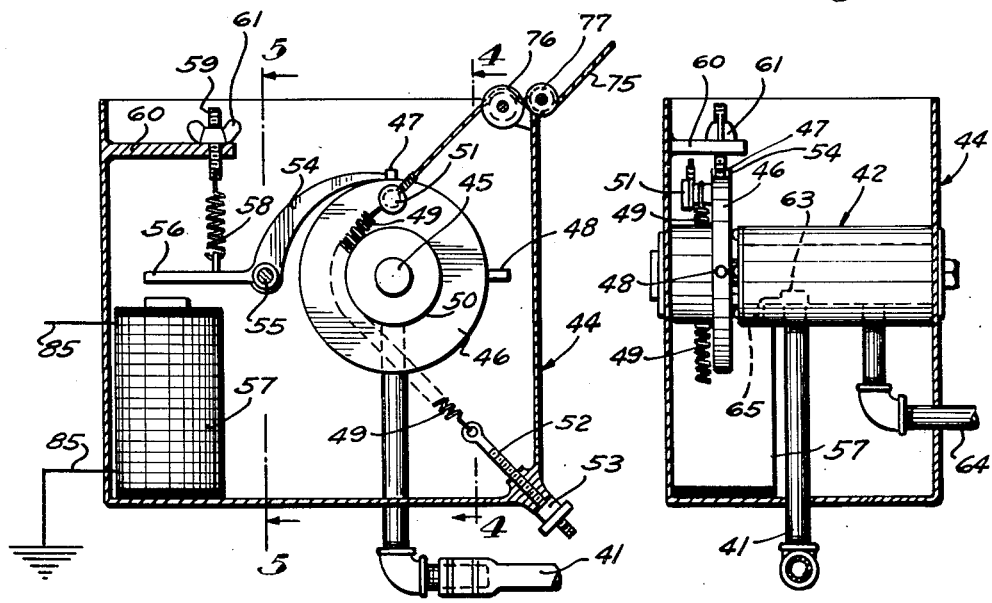
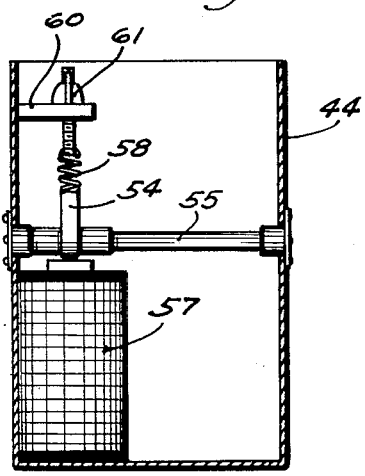
Inventor
A. W. Cowles
By his Attorney
Merchant + Merchant

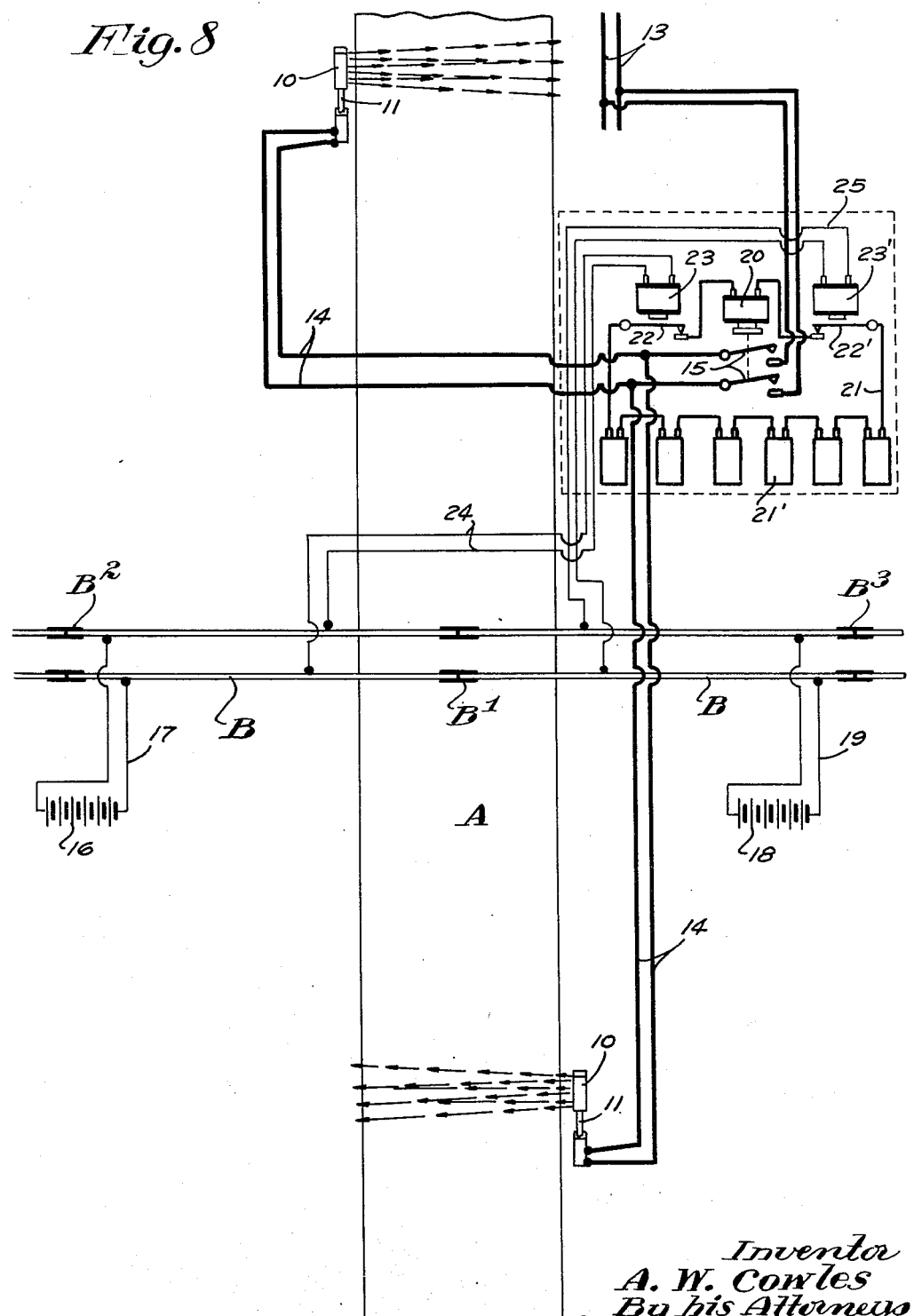

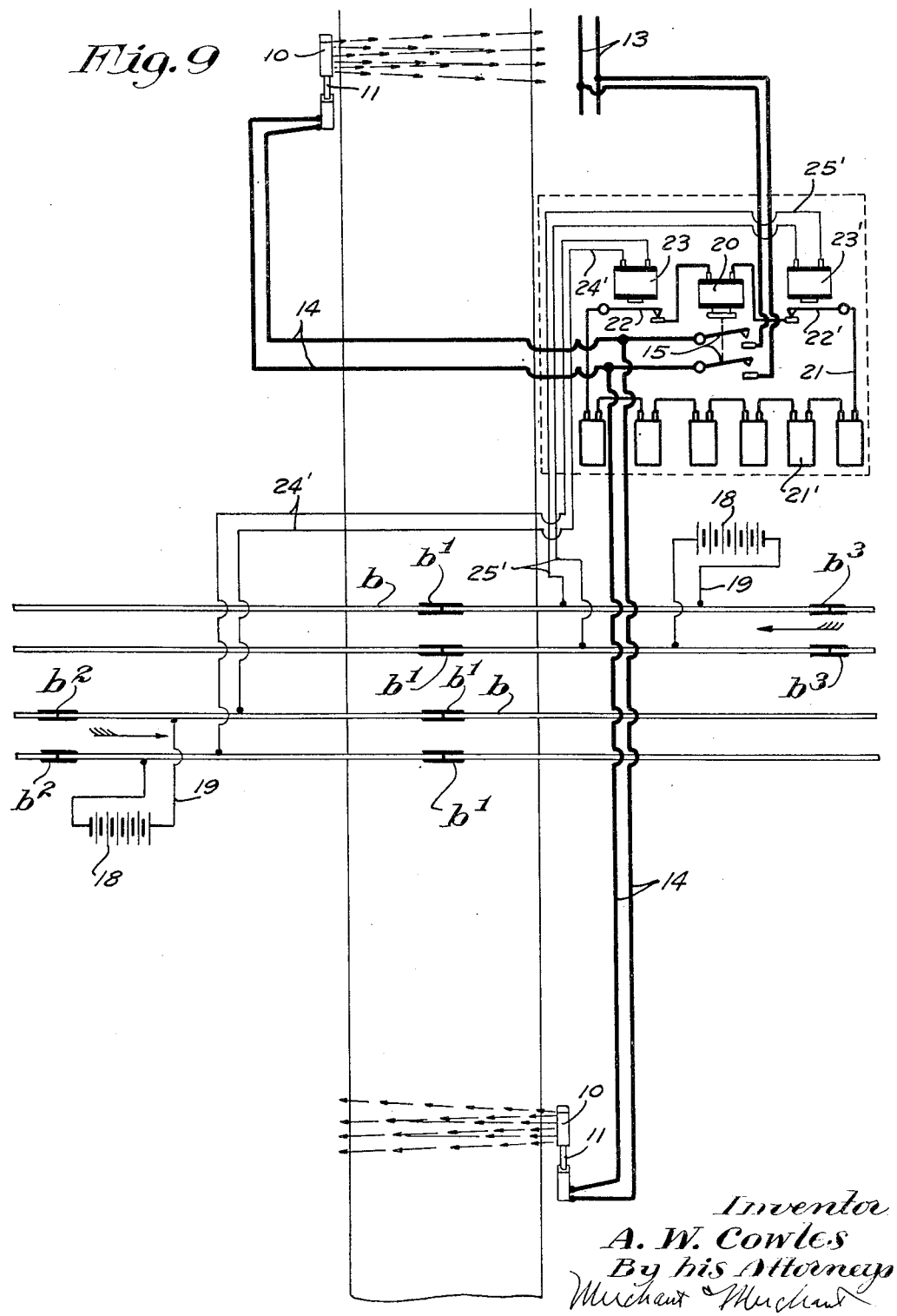

Patented July 16, 1940

2,208,016

UNITED STATES PATENT OFFICE 2,208,016

MEANS FOR AUTOMATICALLY STOPPING VEHICLES AT RAILROAD CROSSINGS

Arthur W. Cowles, New Hampton, Iowa

Application February 2, 1938, Serial No. 188,290

9 Claims. (Cl. 192—13)

My invention provides an apparatus or means for automatically stopping vehicles at railway or other crossings; and, generally stated, the invention consists of the novel devices, combinations of devices and arrangement of parts hereinafter described and defined in the claims.

Particularly, the invention relates to means for stopping motor-propelled vehicles, such as automobiles and trucks, by automatic setting of the brakes whenever the properly equipped vehicle approaches a railway crossing at a time when a locomotive or train is approaching the crossing within some predetermined distance. This system, scheme or apparatus, involves as primary elements: (a) means for projecting a light beam onto or across the vehicle road whenever the engine or train approaches the crossing within the predetermined distance; and (b) on the motor-propelled road vehicle, as the controlling element of the automatic brake setting mechanism, a photo-electric cell or instrument that is responsive to the action of the projected light beam and when acted upon by the light beam operates through cooperating mechanism to automatically set the vehicle brakes.

In a preferred embodiment of the invention, illustrated in the drawings and hereinafter described, the road vehicle is provided with a cylinder and piston motor that is combined with connections for simultaneously releasing the clutch and applying the vehicle brakes; the cylinder of this motor through controlling valve is connected to the intake of the internal combustion engine of the vehicle; and the photoelectric cell operating through a step-up thermionic amplifier and cooperating electro-magnetic switch actuates the brake valve mechanism to automatically throw the brake motor into action to stop the car or vehicle.

A light beam projecting lamp will be placed at one side of the vehicle road on opposite sides of the railroad track; these beam-projecting lamps include electric light bulbs and electric circuits therefore that extend to and include those parts of the metallic railroad track that are within the crossing "block", and which block will extend along the railroad track in opposite directions from the crossing to the extent considered desirable for safety and which may be assumed to be about one-half of a mile on each side of the crossing.

With these general statements made, a more complete description of the invention, as embodied in the accompanying drawings, will now be given.

Referring to these drawings, wherein like characters indicate like parts throughout the several views:

Fig. 2 is a schematic view partly in perspective, partly in elevation, and partly in section, showing the brake-actuating mechanism and the connections thereof to the engine and other parts of the motor-propelled vehicle wherein an internal combustion engine of the customary type is employed;

Fig. 3 is a vertical section taken approximately on the line 3—3 of Fig. 1;

Fig. 4 is a transverse section taken on the line 4—4 of Fig. 3;

Fig. 5 is a transverse section taken on the line 5—5 of Fig. 3;

Fig. 6 is a fragmentary section of the brake motor control valve shown in section in Fig. 2 but showing a different position of the said valve;

Fig. 7 is a diagrammatic view showing the thermionic amplifier and wiring system and showing the same electrically connected to a trip magnet shown in full in Fig. 2;

Fig. 8 is a diagram showing the wiring of the crossing block including the railway track rails and the light beam projecting lamps; and Fig. 9 is a view corresponding to Fig. 8 but showing the wiring for a double track, whereas the wiring of Fig. 8 is for a single track.

Road installation

Figure 1:
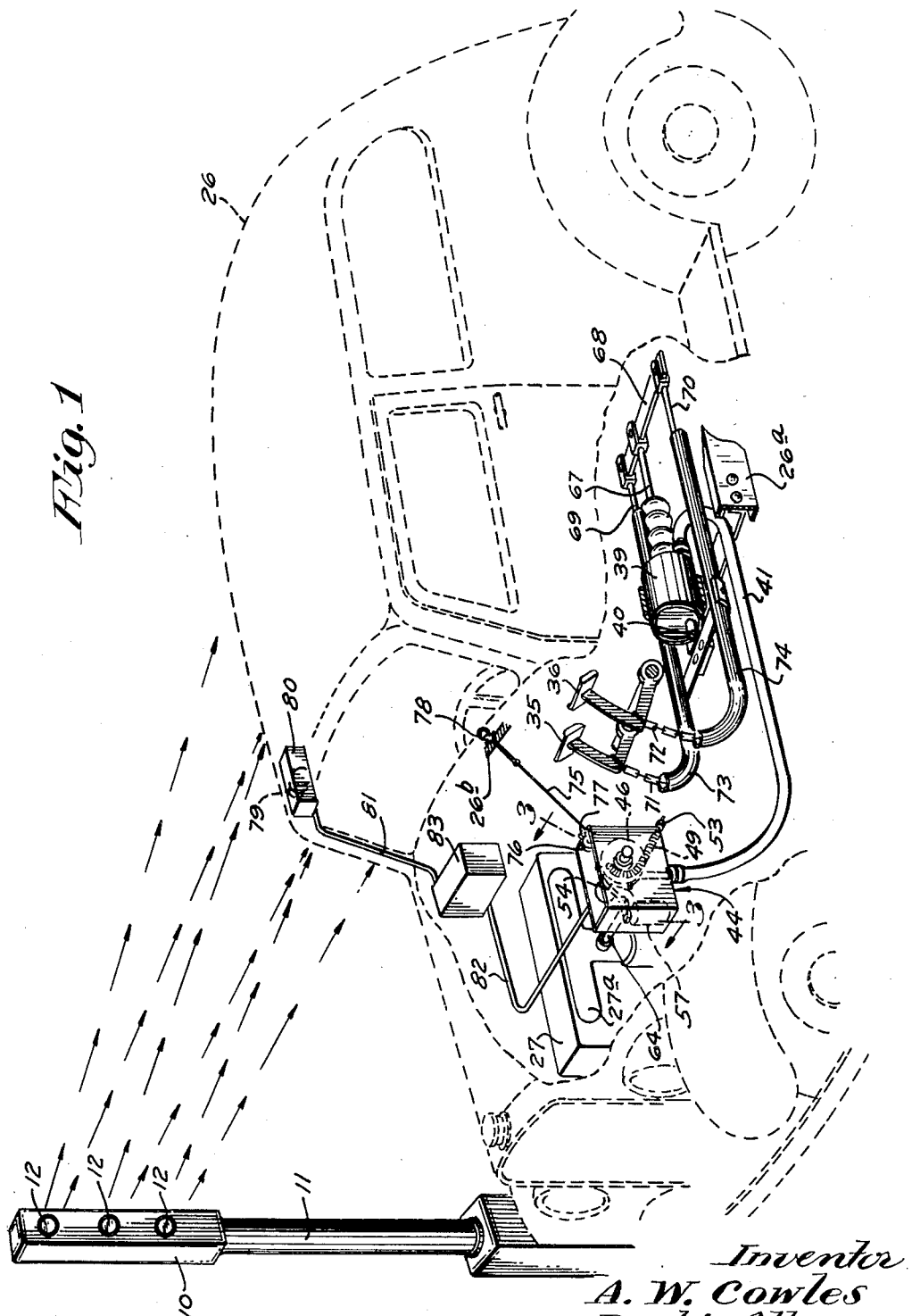
Fig. 1 is a perspective illustrating the manner in which the photo-electric cell of the automobile or motor-propelled vehicle will be passed through the projected light beam, certain parts being shown in full but the body of the automobile being indicated chiefly by dotted lines.

From the foregoing, it will be understood that there are two types of installations, to wit: the road or stationary installation which is associated with the railroad track, and the actuating lamps at the side of the traffic or vehicle road. The type of actuating lamps preferably employed is best shown in Fig. 1, wherein the said lamp is an electric lamp 10 located at the top of a post 11 and involving a plurality of lenses or light fonts 12 arranged to project and vertically spread a flat beam of light across the traffic or vehicle road. These lamps are placed at the side of the traffic road A, one on each side of the railroad track B, at the proper distance from the track or crossing, say 200 feet. The arrangement of the road bed tracks and the electrical connections of the road installation are best shown in Fig. 8, wherein the track rails B, in the vicinity of the road crossing, are separated into crossing blocks by rails insulations B¹, B², and B³.

The current to supply the electric lamps 10 may be supplied from any suitable source, but it is assumed to be alternating current supplied from supply wires 13. These supply wires 13 are connected by lead wires 14 to both of the lamps, through a normally open duplex switch 15. These wires 13 and 14 are indicated by heavy lines in Fig. 8. Obviously, both lamps will be simultaneously cut in circuit and illuminated when and only when switch 15 is closed. At the side of the road A is a storage battery 16 which, by lead 17, is connected across the rails B that are in the block between B¹ and B²; and a battery 18 at the other side of the road A is, by leads 19, connected across the rails B that are in the block between B¹ and B³. The insulations B¹ are shown as placed in the road bed A, but may be located closely adjacent to either side of the road bed.

Normally, the lamp circuit switch 15 is under the action of gravity or otherwise under strain to close the lamp circuit, but is normally held open by an electro-magnet 20. This magnet 20 is in the circuit 21 of a storage battery 21' which, as shown, is made up of a plurality of cells. In the battery circuit 21, at each side of the magnet 20, is a gravity or normally closed trip switch 22 or 22'. These trip switches 22 are subject to normally inactive electro trip magnets 23 or 23'. The left-hand trip magnet 23, by lead wires 24, is connected across the rails B in the left-hand block, to wit: in the block between B¹ and B²; while the right-hand trip magnet 23', by lead wires 25, is connected across the rails in the right-hand block, to wit: between B¹ and B³.

With the connections described, the operation upon approach of a train is as follows: When an engine or train, or for that matter a car of any kind involving the metallic conductors, comes into the left-hand block between B¹ and B², the circuit through left-hand trip magnet 23 will be closed and left-hand trip switch 22 will be opened, thereby causing switch magnet 20 to be de-energized and lamp switch 15 to close causing both of the lamps to be illuminated, with the result that light beams will be projected across the road A on both sides of the track. When the train has passed out of the left-hand block B or passed the rail insulations B¹, the circuit through left-hand-trip magnet 23 will be broken and left-hand trip switch will close; but simultaneously with or prior to this action, the train will pass on to the right-hand block B and circuit will be closed through right-hand trip magnet 23', thereby opening right-hand trip switch 22' so that switch magnet 20 will still be in an open circuit and switch 15 will remain closed and the lamps illuminated until the train has passed beyond the insulations B³, whereupon the circuit through both magnets 23 and 23' will be closed and both of the trip switches 22 and 22' will be closed with the result that magnet 20 will be energized, switch 15 will be opened, and the lamps cut out. When a train moves from the right toward the left, in respect to Fig. 8, the action just described will be the same, except that the order in which the circuits will be closed through the magnet 23 and 23' will be reversed, but with the same general results as to the lighting and extinguishing of the lamps and projection of the light beams.

The arrangement illustrated in Fig. 9 is the same as that illustrated in Fig. 8, except that a double track is shown, one for movement of trains toward the right, and the other for movement of the trains toward the left; and in this arrangement, the insulations b¹, which correspond to the insulations B¹, are centrally located in the rails a of both tracks, while the insulations b², which corresponds to the insulation B², are placed in the one track, and the insulations b³, which correspond to the insulations B³, are placed in the rails of the other track. Also, the lead wires 24', which correspond to the leads 24, are connected across the rails of the one track at one side of the road and the lead wires 25' are connected across the rails of the other track at the opposite side of the road A. So far as the switches and lamp operating action are concerned, the operation of the arrangement in Fig. 9 will be the same as that illustrated in Fig. 8.

*Car installation*

All of the parts shown in Fig. 1, except the beam-projecting lamp and all of the parts shown in Figs. 2 to 7, inclusive, are applied on or carried by the car or motor-propelled vehicle. The motor-propelled vehicle may take various forms but, as shown, is that of a commercial automobile, the parts of which, as far as necessary for the purposes of this case, may be briefly noted as follows: the car body and chassis as an entirety by numeral 26; the internal combustion engine 27; the clutch 28; the transmission shaft 29; rear axle casing 30; rear brake drums 31; brake drum-actuating levers 32; rock-shaft 33; links 34 connecting arms of rock-shaft 33 to brake levers 32; clutch pedal 35; and brake pedal 36, an arm of which is connected by a rod 37 to an arm 38 on brake rock-shaft 33.

As power means for simultaneously releasing the clutch and setting the brakes, I provide a small cylinder and piston motor. Of the parts of this motor the cylinder 39, which will be rigidly secured to the chassis or frame of the automobile, is provided at one end with relief port 40 and at its other end is connected by a pipe 41 to the casing 42 of a motor controlling valve, the movable member of which is shown in the form of a rotary core 43. The valve casing 42 is shown as secured to and within a box or housing 44 that is rigidly secured to a fixed part of the automobile frame. Valve 42 is provided with a projecting stem 45, see particularly Figs. 2 to 6, inclusive, to which is rigidly secured a disc-like flange 46 equipped with stop lugs or projections 47 and 48. Disc 46, and hence valve or core 43, are put under strain to move in a counter-clockwise direction in respect to Fig. 3 by suitable means, such as a coiled spring 49 passed over a hub 50 of said disc with one end attached to an eccentrically located pin 51 of said disc and at its other end attached to an anchor rod 52 that is passed freely through the hub-like bearing of the housing 44 and provided at its outer end with a nut 53 by means of which the tension of said spring can be varied. Normally, the disc 46 is locked in the position shown in Fig. 3, by a retaining dog 54 pivoted to the housing 44 by a shaft 55 and provided with a projecting arm-like armature 56. Armature 56 is adapted to be acted upon to release retaining dog 54, by a trip magnet 57, shown as anchored within the housing 44. Normally, the retaining dog 54 is held in the operative position shown in Fig. 3 by a coiled spring 58 attached thereto and to a screw-threaded rod 59 that is passed loosely through flange 60 of housing 44 and provided at its upper end with a nut 61.

Valve 43 has two circumferentially spaced ports 62 and 63. From the valve casing 42 a pipe 64 is extended to the intake manifold 27a of the internal combustion engine. The ends of the pipes 41 and 64, that are connected to the valve casing 42, are axially aligned but axially spaced in respect to the valve 43 so that when the valve is in normal position, shown in Fig. 6, pipe 41 will be connected to valve port 63 and to the atmosphere through a port 65 in the valve casing 42, but the pipe 64 will be closed by valve 43.

When valve is in the position shown in Fig. 6, port 62 will connect the ends of pipes 41 and 64 so that the suction from the intake manifold 27a of the engine will then produce partial vacuum in the cylinder 39 with the result more fully noted in the description of the operation.

Working within the cylinder 39 is a piston 66, the piston rod 67 of which works through the head of the cylinder and is connected to the intermediate portion of an equalizing bar 68. One end of the bar 68 is connected to the clutch pedal 35 and the other end thereof is connected to the brake pedal 36. These connections may be made in various ways, but the connections shown are as follows: Pivoted to the ends of the equalizing bar 68 are pull rods 69 and 70, which, in turn, are connected respectively to the pedals 35 and 36 by cables or chains 71 and 72 that slide freely through guide tubes 73 and 74. These guide tubes 73 and 74 are rigidly anchored to the vehicle frame 26a, as best shown in Fig. 1.

For resetting the disc 46, and hence the valve 43, in normal position, shown in Fig. 2, after it has been automatically tripped, a suitable manually operated connection is provided. This connection, as shown, includes a cord or cable 75, see Figs. 1, 2 and 3, that is attached to the crank pin 51 of the discs 46, is passed respectively over and under guide rollers 76 and 77 and from thence is passed through the instrument board 26b and terminated in a hand-piece 78 located within easy reach of the driver.

The photo-electric cell or controlling element, that is subject to the projected light beam, is indicated by the numeral 79 and is diagrammatically shown in Fig. 7, while in Fig. 1 the said photo-electric cell is shown as applied in a casing 80 located on the top of the body of the automobile or motor-propelled vehicle in a position where the photo-electric cell must necessarily pass through the projected light beam on approaching across a railroad crossing. In Fig. 1 the numerals 81 and 82 indicate tubular casings for certain of the electrical connections and the numeral 83 indicates a box which contains the thermionic amplifier and which is diagrammatically indicated in Fig. 7.

In Figs. 2 and 7 the battery 84 is the car battery or other suitable source of potential of sufficient energy to cause magnet 57 operating on trip dog 56 to initiate setting of the brakes. For the purpose of this case, this battery 84 may be a six-volt storage battery such as used for automobiles. This battery 84, as indicated by heavy lines in Figs. 2 and 7, is in a circuit 85 which may be assumed to be grounded through metallic parts of the vehicle. This circuit 85, hereinafter called the "trip circuit," includes the trip magnet 57, a manually operated switch 86, and an automatic trip switch, which latter includes fixed contacts 87 and a spring retracted switch lever 88 that acts as an armature and is subject to magnetic flux of a core 89 of an electro-magnet, the winding of which is indicated by the numeral 90 in Fig. 7. For the purpose of this case, the battery 84 will be assumed to be the car battery and the switch 86 will be assumed to be the ignition switch of the vehicle. In accordance with customary automotive practice, one side of this battery, preferably the negative side, is grounded, as shown at 85a, in Fig. 7, and from the other side of the battery 84 and switch 86 the ignition lead 91 leads to the grounded ignition coil 92.

With this arrangement it is evident that in instrumentalities that are sensitive enough to be affected by the action of the light beam on the photo-electric cell 79 and will increase that power sufficiently to cause magnet 90 to retract armature contact 88 and close the tripping switch, will serve to cause automatic setting of the brakes and release of the clutch of the vehicle upon approach of the railroad crossing.

In the preferred arrangement illustrated, the photo-electric cell 79 is connected in a high potential circuit from a suitable source of high potential, such as a B-battery or batteries or a conventional high potential source such as commonly used in connection with radio and other thermionic amplifying circuits. This high potential source is indicated in Fig. 7 by 93 and the said high potential circuit includes a lead 94 from the positive side of the high potential source 93 to one side of the photo-electric cell, a lead 95 from the other side of the photo-electric cell and having interposed therein a resistance 96 and which is connected back to the other side of the battery 93 through the metallic parts of the vehicle. The combined resistance of the photo-electric cell 79 and the serially connected resistance 96 is such as to permit a very low drain on the battery or source 93. The resistance to the flow of current of photo-electric cells of this type is materially varied by light and therefore it will be evident that upon intercepting the beam of light an electrical impulse will be set up in the high potential circuit of the photo-electric cell. This electrical impulse will be too feeble to actuate the switch armature 88 and must, therefore, be amplified for this purpose. Preferably, I accomplish this result in the accepted manner by employing a suitable thermionic amplifying system.

In Fig. 7 a two-stage thermionic amplifier is diagrammatically indicated and will be briefly described as follows:

The thermionic amplifiers, which may be assumed to be of the conventional vacuum tube type such as used in connection with radios, are indicated as entireties by 97, the one at the left being the first stage amplifier and the one at the right being the second stage amplifier. These thermionic amplifiers, in addition to the casings or shells 98 thereof, each include a heater or filament 99, a cathode 100, a plate or anode 101, and a grid 102. The filaments or heaters 99 of the amplifier tubes are connected through suitable leads illustrated to the low voltage automobile battery 84 through and hence subject to the switch 86. The cathode 100 of the first stage or left-hand amplifier tube 97 connected to the negative leg of the filament 99 of said tube is grounded to the metallic parts of the vehicle and hence connects the cathode of this type to the negative side of the batteries 84 and 93. The cathode of the right-hand or second stage amplifier tube 97 is connected to the ground and the negative side of the battery 93 through a serially connected grid bias resistor 103. The grid 102 of the first stage amplifier tube is connected to the negative side of the photo-electric cell circuit through a lead 104 to the lead 95 and having interposed therein a suitable condenser 105. The plate 101 of the first stage amplifier tube is connected to the positive side of the high potential source or battery 93 through a lead 106 having interposed therein the primary winding 107 of a voltage step-up transformer 108 and lead 94. The secondary 109 of this transformer 108 is connected to the negative side of the high potential source 93 through ground in common with the resistor 103 and the other end thereof is connected to the grid 102 of the second stage amplifier tube. The plates 101 of this second stage amplifier tube are connected to the positive side of the high potential source 93 through the medium of a lead 110 having interposed therein the winding 90 of the electromagnetic switch actuator and lead 94.

With the arrangement illustrated, the grids 102 of the thermionic amplifiers 100 will have sufficient grid bias voltage applied thereto to normally maintain a very low current drain in the plate circuits of these amplifying tubes so that the normal drain on the high potential source or battery 93 will be at a minimum. However, when the photo-electric cell 79 becomes suddenly subject to an intercepted beam of light, the resulting electrical impulse set up in the circuit thereof will produce a corresponding pulsatory change in the potential applied to the grid 102 of the first thermionic amplifier. This pulsatory variation in grid voltage on the first tube will result in a pulsatory variation in current flow through the plate circuit of the first tube which includes the primary 107 of the voltage step-up and coupling transformer 108 and, of course, through the medium of the first amplifying tube this pulsatory change set up in the plate circuit of the first tube will be greatly amplified with respect to the initial impulse set up in the circuit of the photo-electric cell. This pulsatory variation in the plate circuit of the first amplifying tube is inductively transmitted to the secondary 109 of the transformer 108 and is felt in the grid circuit of the second thermionic amplifier tube in the form of a voltage change or pulsation which results in a pulsatory increase in current flow through the plate circuit of the second stage thermionic amplifier. This amplifier pulsation in the plate circuit of the second thermionic amplifier momentarily increases the voltage dropped across the electro-magnetic winding 90 sufficiently to produce a magnetic flux in the magnetic core 89 capable of drawing the armature arm or lever 88 into engagement with the fixed switch contacts 87, thereby momentarily closing the trip switch circuit 85 which includes the winding of electro-magnet 57.

*Summary of operation*

The manner in which the light beam is projected across the road way when a train approaches the road crossing, has already been fully described. In a sort of disconnected way the operation of the various devices on the car, truck or other moving vehicle has also been described or at least indicated. The order or sequence of the operations that take place when the photo-electric cell on the vehicle passes through the light beam may be summed up as follows: When the light beam acts on the photo-electric cell through the electric devices described and particularly illustrated in Fig. 7, armature acting switch contact 88 will close the trip circuit 85. This, of course, assumes that the ignition switch 86 has already been closed as was necessary to start or keep the engine in action and the vehicle in motion. When trip circuit 85 is closed magnet 57 will be energized and acting on trip dog 54 will release disc 46, see Fig. 3, to permit said disc to move through approximately 90° where it will be stopped by engagement of the relatively long lug 48 with the then raised free end of the dog 54.

As already stated, Fig. 2 indicates the normal position of the valve 43 and position in which it will be held when the parts are in the position shown in Fig. 3. When disc 46 is released, as above just stated, spring 49 will cause the above noted rotation of the disc and hence of the valve 43 so that the said valve 43 will then be set in the position shown in Fig. 2, in which position port 62 of said valve will connect the ends of pipes 41 and 64. When the valve is thus set and the two pipes 41 and 64 are connected, the interior of brake cylinder 39 will be connected to the intake manifold 27, thereby producing partial vacuum in the cylinder which will move the piston 66 and equalizing bar 68 toward the right in respect to Fig. 2; and when said bar 68 is thus moved the clutch pedal 35 and the brake pedal 36 will be thereby depressed or drawn downward producing the same effect as if the two pedals were by foot actions simultaneously depressed to release the clutch and set the brakes.

When the disc 46 has been released and moved as just above described, the mechanism can be reset for repeated actions only by restoring said disc and the valve 43 to normal positions; and this, as described, can be easily done by pulling on the resetting cable 75.

It is here important to note that even when the said valve 43 has been reset to its normal position shown in Fig. 2 so as to permit movement of air from the atmosphere into the cylinder 39, the return movement of the piston 66 under the action of the clutch-setting and brake-releasing springs of the vehicle, the return movement of the piston will be slow or retarded because of the restriction in the air vent 65 of Fig. 2. It follows from this retarding action that the release of the brakes and resetting of the clutch will be slow, say one or two minutes more or less causing very much delay before the vehicle can be again started and moved toward the railway crossing. This delayed interval is supposed to be enough to prevent the car from running into a long train before it is completely across the road.

In actual practice to prevent the photo-electric cell from being operated upon by the lights, such as encountered around the streets of a city, the lamps for projecting the light beam and the selenium or element of the photo-electric cell can be tuned for coaction in respect to certain color or kind of light beam that is not generally encountered.

From the foregoing, it will be understood that the apparatus herein illustrated is capable of various modifications within the scope of the invention herein disclosed and broadly claimed.

What I claim is:

1. A motor-propelled vehicle equipped with an internal combustion engine, transmission mechanism including a manually operated clutch, manually operated brake mechanism, and a cylinder and piston brake motor; of a suction conduit connecting the brake cylinder to the intake manifold of said engine; a valve mechanism interposed in said suction conduit normally to cut off the connection between said cylinder and intake manifold and to connect said cylinder to the atmosphere; means tending to actuate said valve to connect said cylinder to said intake manifold; a latch normally holding said valve mechanism set in first noted position; and electro-magnetic tripping means including a trip magnet operative on said latch to trip said valve mechanism.

2. The structure defined in claim 1 in which said vehicle is further equipped with foot actuated pedals, one for releasing said clutch, and the other for manually setting said brakes, and in which the piston of said brake motor is equipped with an equalizing lever, the ends of which are respectively connected to said two foot pedals.

3. The structure defined in claim 1 in which manually operative means are provided for resetting said valve mechanism to normal positions after each automatic brake setting and clutch releasing action.

4. The structure defined in claim 1 in which manually operative means are provided for resetting of the valve mechanism to normal position after each automatic brake and clutch releasing action, combined with means for delaying the starting of a car after it has been automatically stopped for a material period of time after said valve has been reset.

5. A road vehicle equipped with an engine, transmission mechanism, a manually operated brake, a brake actuating motor with actuating connection to said brake constructed and operative to stop the vehicle independently of the manual brake actuation, means for actuating said brake motor from said engine including a fluid conduit and control valve therein, the latter being normally biased to move to a brake motor actuating position, a latch for restraining said valve against such movement, an electromagnetic trip for said latch, a photo-electric cell carried by said vehicle and responsive to a projected light beam through which it may be passed, and electromagnetic connections including a thermionic amplifier operatively connecting said cell to said electromagnetic trip.

6. The structure defined in claim 5 in which said control valve has a restricting discharge passage leading to the atmosphere and through which exhaust from the brake motor discharges, whereby starting of the car after having been automatically stopped, is delayed for a considerable interval of time.

7. The structure defined in claim 5 in which said road vehicle has a brake pedal, a clutch and a clutch pedal, and the movable element of said brake motor is connected to said two pedals through an equalizing lever.

8. A road vehicle equipped with an engine, a manually operated brake, a pneumatic brake actuating motor with actuating connection to said brake constructed and operative to stop the vehicle independently of the manual brake action, electro-magnetic means including a photo-electric cell operative to set the brake and stop the car when the photo-electric cell passes through a projected light beam, means for releasing the brake and for setting the motor for repeated brake setting action, and means for delaying the release of the brake after said releasing and setting means has been initially actuated.

9. A road vehicle equipped with the following elements, to wit; driving road wheels, a propelling motor, means operative to uncouple said motor from the driving road wheels and stop the vehicle, said means including a photo-electric cell that is sensitive to a projected light beam, manually operated starting mechanism for again rendering the motor operative to propel the vehicle, and retarding means actuated by the setting of said starting mechanism, and operative to delay the subsequent vehicle driving action for a considerable period of time after said starting mechanism has been set to effect driving of the vehicle.

ARTHUR W. COWLES.